United States Patent
Linossier

(10) Patent No.: US 10,295,840 B2
(45) Date of Patent: May 21, 2019

(54) RIMLESS GLASSES FRAME INCLUDING AT LEAST ONE FLEXIBLE CLAMPING ELEMENT

(71) Applicants: Pierre-Franck Linossier, Le Puy en Velay (FR); Richard Chene, Neuilly sur Seine (FR); Dominique Delamour, Les Mesnuls (FR); Alain Miklitarian, Paris (FR)

(72) Inventor: Pierre-Franck Linossier, Le Puy en Velay (FR)

(73) Assignees: Richard Chene, Neuilly (FR); Dominique Delamour, Les Mesnuls (FR); Alain Miklitarian, Paris (FR); Pierre-Franck Linossier, Le Puy en Velay (FR)

(*) Notice: Subject to any disclaimer, the term of this patent is extended or adjusted under 35 U.S.C. 154(b) by 0 days.

(21) Appl. No.: 15/545,662

(22) PCT Filed: Jan. 26, 2016

(86) PCT No.: PCT/EP2016/051542
§ 371 (c)(1),
(2) Date: Jul. 21, 2017

(87) PCT Pub. No.: WO2016/120256
PCT Pub. Date: Aug. 4, 2016

(65) Prior Publication Data
US 2018/0004009 A1    Jan. 4, 2018

(30) Foreign Application Priority Data
Jan. 27, 2015  (FR) .................................... 15 50594

(51) Int. Cl.
G02C 1/02    (2006.01)

(52) U.S. Cl.
CPC ............... *G02C 1/023* (2013.01); *G02C 1/02* (2013.01); *G02C 2200/06* (2013.01)

(58) Field of Classification Search
CPC ..................................... G02C 5/22; G02C 1/02
(Continued)

(56) References Cited

U.S. PATENT DOCUMENTS 6,296,357 B1 * 10/2001 Bof ........................ G02C 1/023
                                                                  351/106
2003/0048407 A1 * 3/2003 Rivera ...................... G02C 1/08
                                                                  351/135

FOREIGN PATENT DOCUMENTS

FR    1475738 A    4/1967
FR    2803668 A1    7/2001
(Continued)

OTHER PUBLICATIONS

Search Report from French Intellectual Property Office on related FR application (FR1550594) dated Nov. 12, 2015.

*Primary Examiner* — Hung X Dang
(74) *Attorney, Agent, or Firm* — Klein, O'Neill & Singh, LLP

(57) ABSTRACT

The present invention relates to a rimless glasses frame including at least one flexible clamping element having at least one connection portion which comprises at least two jaws which are suitable for clamping a spectacle lens, and at least one joining portion which comprises at least one cavity designed to allow said jaws to open as a result of said cavity being pressed, and including at least one locking element mounted in said cavity in the joining portion of the clamping element so as to lock said jaws closed.

19 Claims, 4 Drawing Sheets

(58) Field of Classification Search
USPC .................................. 351/110, 124, 41, 153
See application file for complete search history.

(56) References Cited

FOREIGN PATENT DOCUMENTS

FR          2861188  A1    4/2005
WO     WO 99/19760  A1    4/1999

* cited by examiner

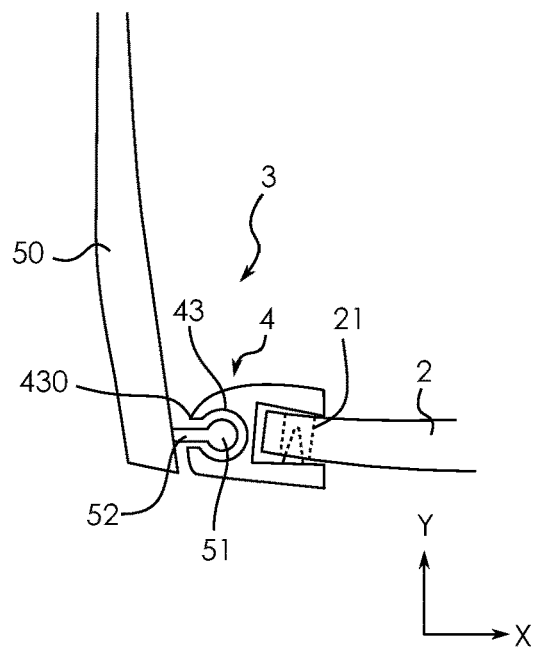
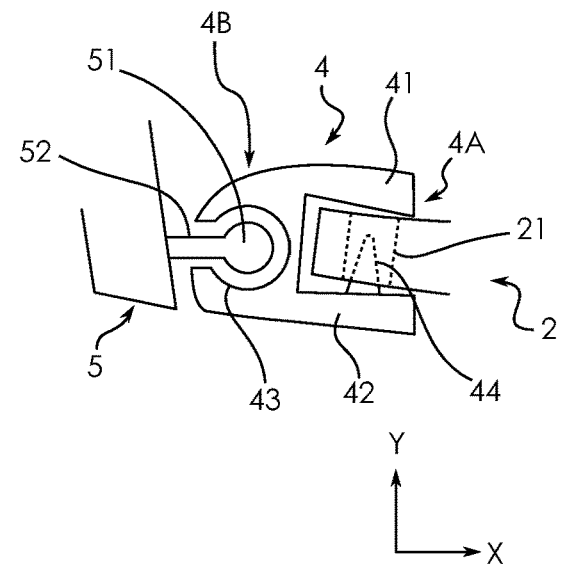
FIGURE 3　　　　FIGURE 4
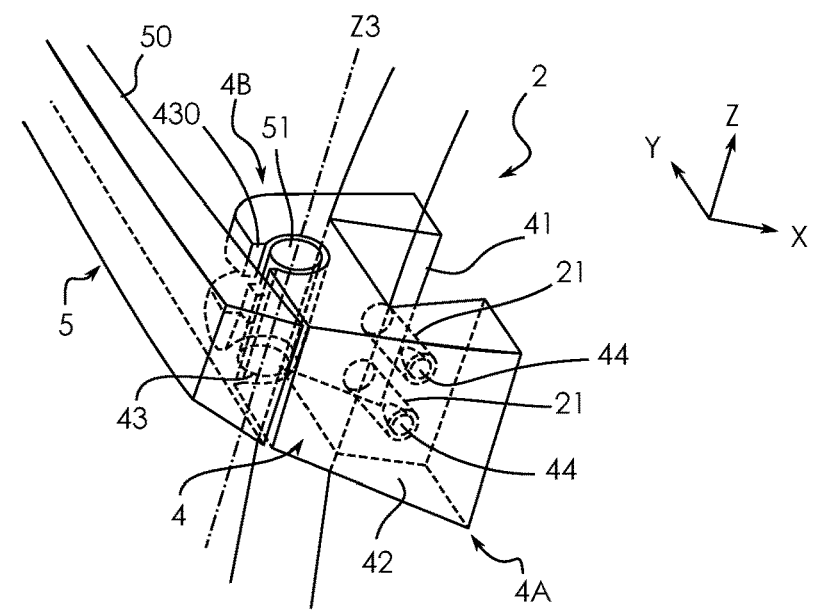
FIGURE 5

RIMLESS GLASSES FRAME INCLUDING AT LEAST ONE FLEXIBLE CLAMPING ELEMENT

GENERAL TECHNICAL FIELD OF ART

This invention relates to the field of glasses frames and, in particular, a rimless glasses frame.

BACKGROUND

Conventionally, a rimless frame comprises two side temples and a central bridge which are suited to be connected to two rimless lenses (a right lens and a left lens). In reference to FIG. 1, a pair of glasses with a rimless frame 10 is shown which comprises two lenses 2 each connected to a temple 9 and to the central bridge 93. To this effect, each lens 2 comprises at least one temple orifice 21, suited to allow for the bolting of the temple 9 to the lens 2, and at least one bridge orifice 22, suited to allow for the bolting of the central bridge 93 to the lens 2. The orifices of the temple 21 and of the bridge 22 are pierced in the lens 2. By way of example, the temple 9 comprises a threaded rod which has to be slid into the temple orifice 21 of the lens 2 in order to receive a nut or a plastic shaft wherein can be slid a rod in order to lock the connection.

In practice, each temple 9 comprises a front portion 91 connected to the lens 2 and a rear portion 92 intended to be in contact with the temple of the user, the front 91 and rear 92 portions are hinged together about a vertical axis Z in such a way as to allow the rear portion 92 of the temple 9 to be folded.

The mounting of a rimless frame is complex and long to implement given that the optician must, on the one hand, precisely slide the threaded rod of the temple/bridge into an orifice of the lens and, on the other hand, screw the nut onto the threaded rod introduced into said piercing. These operations are all the more so tedious as the diameter of the nut is less than 1-2 mm, which requires the optician to have suitable tools.

Incidentally, it is also known in U.S. patent application Ser. No. 972,053 a rimless frame wherein the central bridge comprises a clamp suited in order to clamp the edge of the lens. The clamp comprises two jaws connected by a screw that makes it possible to clamp said jaws on the lens in such a way as to secure the central bridge to the lens. Similarly, the mounting of such a frame is complex to implement given that it requires manipulating a large number of individual parts with specific tools.

The invention therefore has for purpose to overcome these disadvantages by proposing a rimless frame that is simple and fast to mount and which can also be dismounted easily.

SUMMARY

To this effect, the invention relates to a rimless glasses frame comprising:
- at least one flexible clamping element comprising
  - at least one connection portion comprising at least two jaws which are suitable for clamping a glasses lens and
  - at least one joining portion comprising at least one cavity configured to allow said jaws to open as a result of said cavity being pressed, and
- at least one locking element mounted in said cavity of the joining portion of the clamping element in such a way as to lock said jaws closed.

Thanks to the invention, the clamping of the lens can be carried out simply and easily par an optician without specific tools. Indeed, it is sufficient for the optician to open the flexible clamping element in the manner of a clothespin so as to clamp the lens. The locking element advantageously makes it possible to secure the clamping of the lens by preventing any unintentional opening of the clamping element.

Preferably, the locking element is removably mounted in said cavity so as to allow for easy replacement of the frame.

According to a preferred aspect, said clamping element is a single piece. As the number of parts is limited, mounting is facilitated.

Preferably, said clamping element is made of a plastic material so as to be flexible while still having a limited cost. It goes without saying that the clamping element could be made from other materials, for example, metal.

Preferably, at least one of said jaws comprises at least one tooth suitable for cooperating with an orifice of a glasses lens, which makes it possible to index said jaw with respect to the lens and as such allow for a precise positioning.

Advantageously, said jaw comprises at least two teeth in order to prevent any rotation between the clamping element and the lens, which improves the mounting of the frame.

Preferably, each tooth is tapered in order to allow for a progressive clamping of the lens by the clamping element as well as a centring.

According to a preferred aspect, the frame comprises at least one glasses temple which comprises a front portion comprising at least one flexible clamping element and a rear portion comprising at least one locking element. Advantageously, the temple incorporates all of the elements for the clamping of the lens.

Preferably, the front portion comprises a unique flexible clamping element and the rear portion comprises a unique locking element.

Preferably, the flexible clamping element is hinged with the locking element in order to allow for a folding of the temple. As such, the locking element fulfils a first function of locking and a second function of hinging, which is advantageous.

Preferably, the rear portion of said temple comprises a first element and a second element which are connected in an adjustable way so as to allow for an adjusting of the length of the temples.

As the frame comprises a central bridge, said central bridge comprises a main member comprising at least one flexible clamping element, preferably two, and an auxiliary member comprising at least one locking element, preferably two. Advantageously, with two clamping elements, the main member connects two lenses together.

Preferably, the auxiliary member comprises an imprint adapted to be in contact with the nose of the user. Advantageously, it is sufficient to choose the auxiliary member of which the imprint is adapted to the morphology of the nose of the user so as to obtain a customised frame at least cost.

The invention also relates to a pair of glasses comprising two lenses and a glasses frame such as presented hereinabove. Preferably, each lens is clamped at its two lateral ends by a clamping element.

The invention further relates to a method for mounting a pair of rimless glasses such as presented hereinabove, with the method comprising:
- a step of pressing the cavity of the flexible clamping element in such a way as to open the jaws;
- a step of inserting a lens between said jaws;

a step of stopping the pressing in such a way as to close said jaws and clamp the lens;

a step of mounting the locking element in said cavity of the clamping element in such a way as to lock said jaws closed on the lens.

Such a method is advantageous given that it can be carried out manually and quickly by an optician. Furthermore, the dismounting of the frame remains easy.

BRIEF DESCRIPTION OF THE DRAWINGS

The invention shall be better understood when reading the following description, given by way of example, and in reference to the annexed drawings wherein:

FIG. 3 is a diagrammatical cross-section view of a connection between a lens and a temple of the frame;

FIG. 4 is a close-up view of FIG. 3;

FIG. 5 is a diagrammatical perspective view of FIG. 3;

Note that the figures disclose the invention in a detailed manner in order to implement the invention, said figures are of course able to be used to better define the invention where applicable.

DETAILED DESCRIPTION

Figure 1:
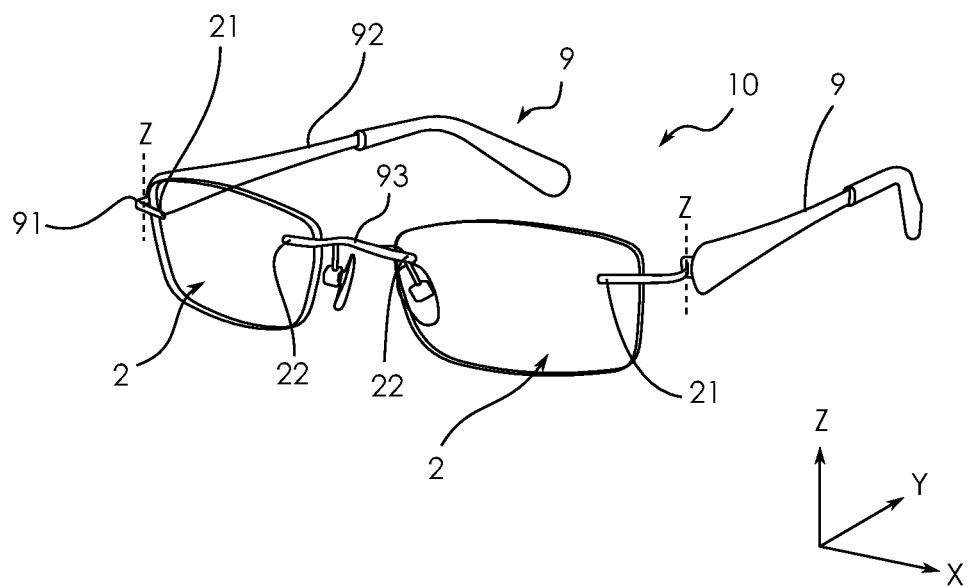
FIG. 1 diagrammatically shows a pair of glasses with a rimless frame according to the prior art.
Figure 2:
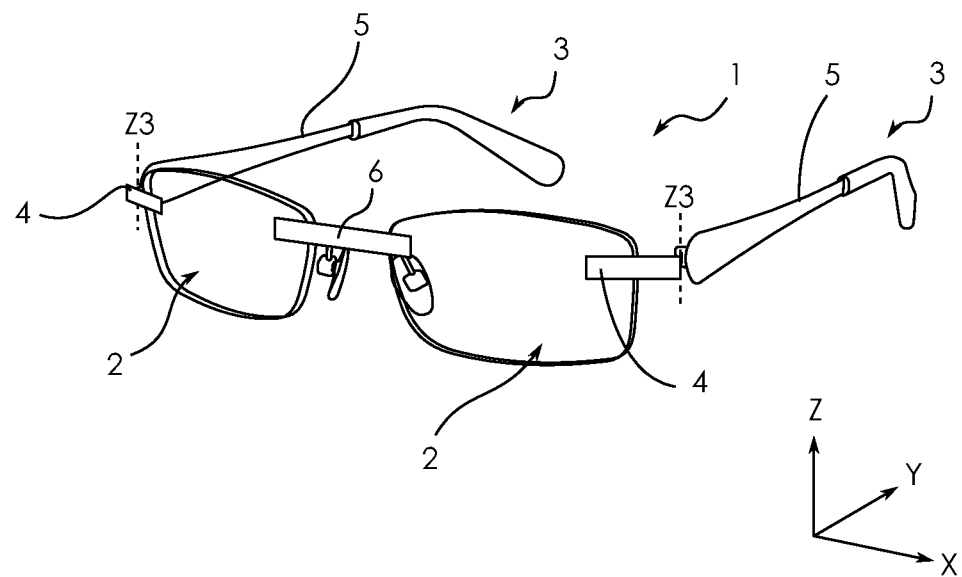
FIG. 2 diagrammatically shows a pair of glasses with a rimless frame according to the invention.

In reference to FIG. 2, a pair of glasses 1 is shown comprising a rimless frame, comprising two hinged side temples 3 and a central bridge 6 which are connected to two rimless lenses 2.

In what follows, the pair of glasses 1 shall be presented in an orthogonal system (X, Y, Z) wherein the axis X extends horizontally and parallel to the lenses 2, the axis Y extends parallel to the temples 3 in the position of use and the axis Z extends vertically. In reference to FIGS. 3 to 5, a lens 2 is shown extending substantially in a plane (X, Z) referred to as "front face" and comprising at one end two temple through orifices 21 made, in this example, by piercing. The temple orifices 21 are aligned vertically according to the axis Z. It goes without saying that they could be aligned according to any axis belonging to the plane of the front face.

As shown in FIG. 2, each side temple 3 comprises a front portion 4 connected to the lens 2 and a rear portion 5 intended to be in contact with the temple of the user, the front 4 and rear 5 portions are hinged together about a vertical axis Z3 in such a way as to allow the rear portion 5 of the temple 3 to be folded.

As shown in FIGS. 3 to 5, the rear portion 5 of the temple 3 comprises a longitudinal body 50, suited to come into contact with the temples of a user, and a locking element 51 that has, in this example, the form of a vertical cylinder connected to the longitudinal body 50 by a tenon 52. It goes without saying that the section of the cylinder could be annular, oval or other. An oval section advantageously makes it possible to define open/closed positions that are frank.

In this example, in reference to FIGS. 3 to 5, the front portion 4 of the temple 3 has the form of a flexible clamping element comprising a connection portion 4A comprising two jaws 41, 42 which are suitable for clamping the glasses lens 2 and a joining portion 4B comprising a cavity 43, extending vertically, configured to allow said jaws 41, 42 to open as a result of said cavity being pressed 43. In other words, in the manner of a clothespin, if the operator deforms by pressing the cavity 43, the jaws 41, 42 separate due to the flexibility of the clamping element. During the pressing, the section of the cavity 43 decreases. On the contrary, in the absence of pressing, the jaws 41, 42 are closed and clamp the edge of the lens 2 between them. In what follows, the first jaw 41 is designated as "rear jaw 41" while the second jaw 42 is designated as "front jaw 42". In this example, the front portion 4 of the temple 3 extends longitudinally.

Preferably, in reference to FIGS. 3 to 5, the front jaw 42 comprises two teeth 44 suitable for being introduced into the two temple orifices 21 of the lens 2. As such, the position of the front portion 4 of the temple 3 is perfectly defined with respect to the lens 2. Furthermore, the use of teeth 44 makes it possible to firmly clamp the lens 2 by preventing any relative displacement. Finally, the use of at least two teeth 44 makes it possible to prevent any relative rotation between the front portion 4 and the lens 2, which improves the service life of the pair of glasses and the aesthetics thereof. More preferably, each tooth 44 is tapered in such a way as to allow for an optimum centring when it is inserted into a temple orifice 21 as well as a progressive clamping. The presence of teeth 44 on the front jaw 42 makes it possible to improve the aesthetics given that the latter are hidden during the use of the pair of glasses. However, alternatively or cumulatively, the rear jaw 41 could include teeth 44. Preferably, the jaws 41, 42 are convex or concave in order to adapt to the shape of the lens 2 to be clamped.

As shown in FIG. 4, the locking element 51 of the temple 3 is configured to be mounted in the cavity 43 of the front portion 4 of the temple 3 in such a way as to prevent any deformation of the cavity 43 by pressing. In other words, the locking element 51 makes it possible to maintain the jaws 41, 42 closed in order to clamp the lens 2. As shown in FIG. 5, the temple 3 comprises a slot 430 allowing for access to the cavity 43.

In this example, entirely advantageously, the locking element 51 cooperates with the cavity 43 in such a way as to form a hinge of axis Z3. As such, the locking element 51 makes it possible, on the one hand, to maintain the jaws 41, 42 clamped and, on the other hand, to hinge the rear portion 5 of the temple 3 with its front portion 4. As shown in FIG. 3, the locking element 51 has a cylindrical section of which the diameter is substantially equal to that of the cavity 43 in the absence of pressing.

The mounting of the temple 3 is particularly simple to carry out given that it is sufficient for the optician to press on the joining portion 4B so that the connection portion 4A opens in order to allow for the insertion of the edge of lens 2. Then, when the pressing is stopped, due to its flexibility, the front portion 4 is closed, the teeth 44 of the front jaw 42 penetrating into the temple orifices 21 in order to clamp the edge of the lens 2. Thanks to the teeth 44, the position of the front portion 4 is perfectly defined with respect to the lens 2.

During the introduction of the locking element 51 into the cavity 43 of the front portion 4 of the temple 3 via the mounting slot 430, the jaws 41, 42 are forced into the closed position due to the flexibility of the front portion 4, which secures the clamping of the lens 2. At the same time, the rear portion 5 is hinged at the front portion 4 of the temple 3, which allows the temple 3 to extend perpendicularly or parallel to the lens 2. According to a preferred aspect, the temple 3 can include means for securing the mounting of the rear portion 5 in the front portion 4 in order to prevent any unintentional withdrawal, for example, a cover or a pin.

A lens 2 was presented comprising two temple orifices 21 but it goes without saying that the invention also applies to a lens that comprises a single temple orifice 21 or more than two temple orifices 21. Likewise, each orifice 21 is not necessarily a through orifice and could be blind only.

Advantageously, the rear portion 5 of the temple 3 can be removed from the front portion 4 so as to allow for the release of the lens easily. The frame can as such be replaced easily. One or several lenses can also be replaced easily. According to a preferred aspect, one or several portions of the temple can be replaced so as to change the aesthetic aspect of the frame.

Figure 6:
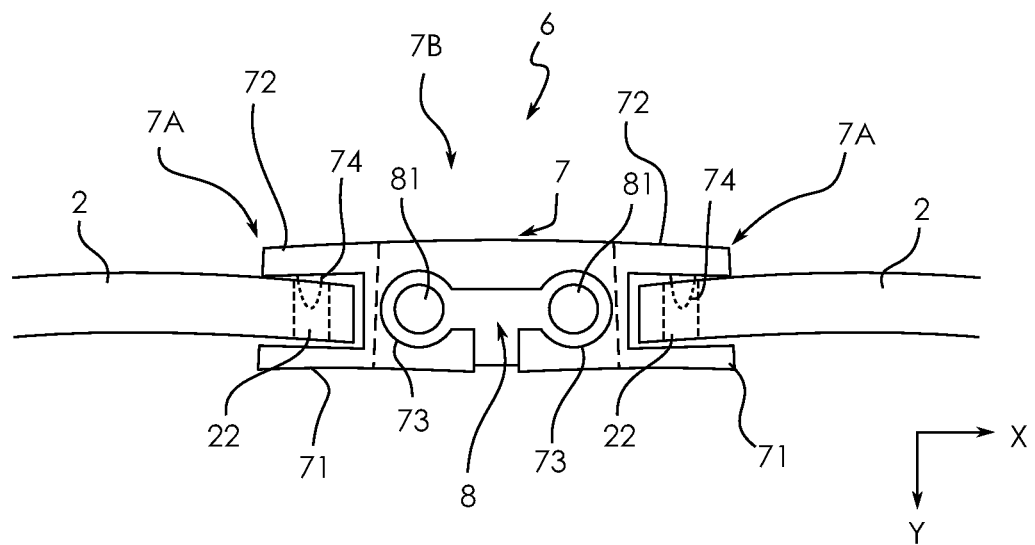
FIG. 6 is a diagrammatical cross-section view of a connection between a lens and a central bridge of the frame.
Figure 7:
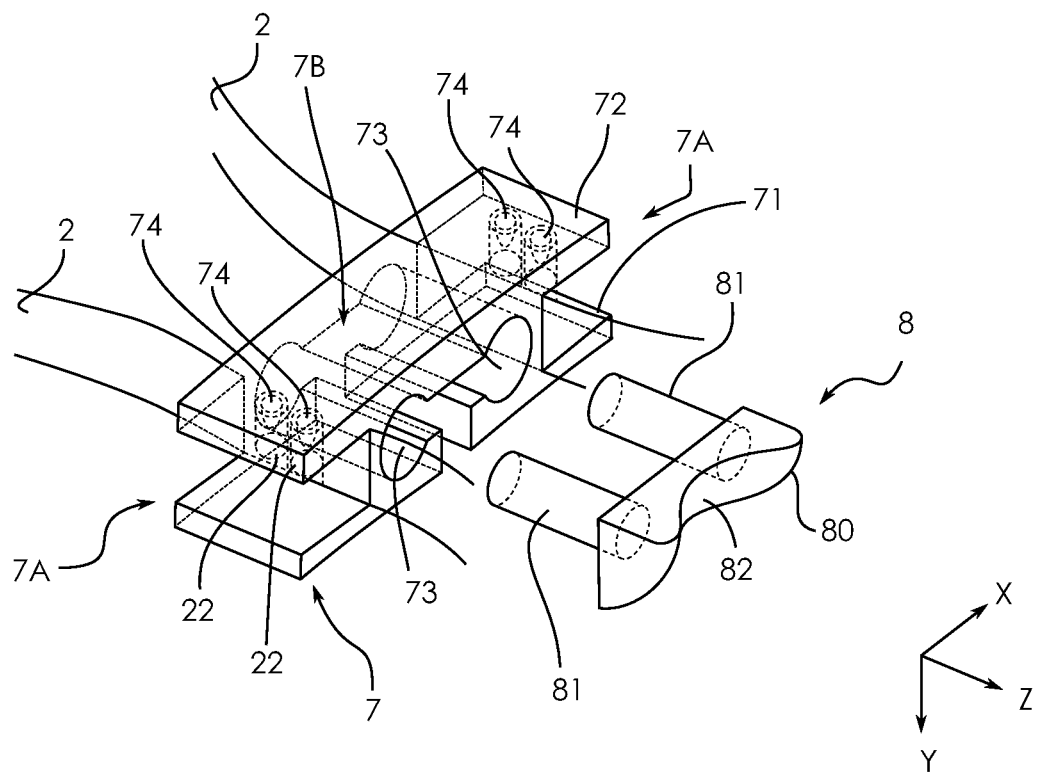
FIG. 7 is a diagrammatical perspective view of FIG. 6.

In reference to FIGS. 6 and 7, each lens 2 extends substantially in a plane (X, Z) referred to as "front face" and comprises at one end two bridge through orifices 22 made, in this example, by piercing. The bridge orifices 22 are aligned vertically according to the axis Z and formed at the opposite end of the lens 2 with respect to the temple orifices 21. It goes without saying that they could be aligned according to any axis belonging to the plane of the front face.

As shown in FIGS. 6 and 7, the central bridge 6 comprises a main member 7 and an auxiliary member 8 that cooperates with the main member 7. The main member 7 of the central bridge 6 extends longitudinally along the axis X and comprises a central joining portion 7B and, at each one of its ends, a connection portion 7A.

Each connection portion 7A forms a clamping element that comprises two jaws 71, 72 which are suitable for clamping a glasses lens 2. In this example, the joining portion 7B comprises two cavities 73, extending vertically, configured to allow said jaws 71, 72 to open following a pressing. In other words, each pair of jaws 71, 72 is associated with a cavity 73. As such, in the manner of a clothespin, if the operator deforms by pressing a cavity 73, the associated jaws 71, 72 separate due to the flexibility of the clamping element. During the pressing, the section of the cavity 73 decreases. On the contrary, in the absence of pressing, the jaws 71, 72 are closed and clamp between them the edge of the lens 2. In what follows, each first jaw 71 is designated as "rear jaw 71" while each second jaw 72 is designated as "front jaw 72". Preferably, the jaws 71, 72 are convex or concave in order to adapt to the shape of the lens 2 to be clamped.

Preferably, similarly to the temples 3, in reference to FIGS. 6 and 7, each front jaw 72 comprises two teeth 74 suitable for being introduced into the two bridge orifices 22 of the lens 2. As such, the position of the central bridge 6 with respect to the lens 2 is perfectly defined. As indicated hereinabove, the use of teeth 74 makes it possible to firmly clamp the lens 2 by preventing any relative displacement. With a concern for clarity, the characteristics and advantages similar to the connection of the temple 3 will not be shown. In this example, the main member 7 is a single piece.

In reference to FIGS. 6 and 7, the auxiliary member 8 of the central bridge 6 comprises a body 80 extending longitudinally according to the axis X which comprises an imprint 82 suitable for being in contact with the nose of the glasses wearer. Advantageously, the optician can arrange a collection of auxiliary members 8 of which the imprints 82 are different in order to adapt to different morphologies.

As shown in FIGS. 6 and 7, the auxiliary member 8 comprises two locking elements 81 extending vertically according to the axis Z in such a way as to be able to cooperate with the cavities 73 of the main member 7. In this example, the auxiliary member 8 is a single piece.

Similarly to a locking element 51 of the temple 3, each locking element 81 of the auxiliary member 8 is configured to be mounted in a cavity 73 in such a way as to prevent any deformation of the cavity 73 by pressing. In other words, the locking element 81 makes it possible to maintain the jaws 71, 72 closed in order to clamp the lens 2.

As such, the central bridge 6 comprises two clamping elements which can be locked easily and simultaneously by inserting the auxiliary member 8 into the main member 7.

The mounting of the central bridge 6 is particularly simple to be carried out given that it is sufficient for the optician to press on the joining portion 7B of the main member 7 so that one of the connection portions 7A opens in order to allow for the insertion of the edge of the lens 2. Then, when the pressing is stopped, due to its flexibility, the jaws 71, 72 close, the teeth 74 of the front jaw 72 penetrating into the bridge orifices 22 in order to clamp the edge of the lens 2. These steps are repeated for the connection of each lens 2. In order to lock the main member 7 of the central bridge 6, the auxiliary member 8 is introduced from the bottom upwards into the main member 7 in such a way that each locking element 81 penetrates into a cavity 73 of the main member 7, the jaws 71, 72 are forced into closed position due to the flexibility of the connection portions 7A, which secures the clamping of the two lenses 2 simultaneously.

A lens 2 was presented comprising two bridge orifices 22 but it goes without saying that the invention also applies to a lens 2 comprising a single bridge orifice 22 or more than two bridge orifices 22. Likewise, each bridge orifice 22 is not necessarily a through orifice and could be blind only.

Thanks to the invention, the entire glasses frame can be mounted simply and quickly while still being able to be dismounted easily. In practice, the frame can be associated with the two lenses in about ten seconds, which allows a substantial amount of time to be saved.

Alternatively, the central bridge 6 comprises a main member 7 and two auxiliary members that each have the form of a nose pad that integrates a locking element of a cavity 73 of the main member 7. As such, the jaws 71, 72 of the main member 7 are locked during the positioning of the nose pads. Furthermore, the optician can select the nose pad that is most suited to the morphology of the user, which is advantageous.

Figure 8:
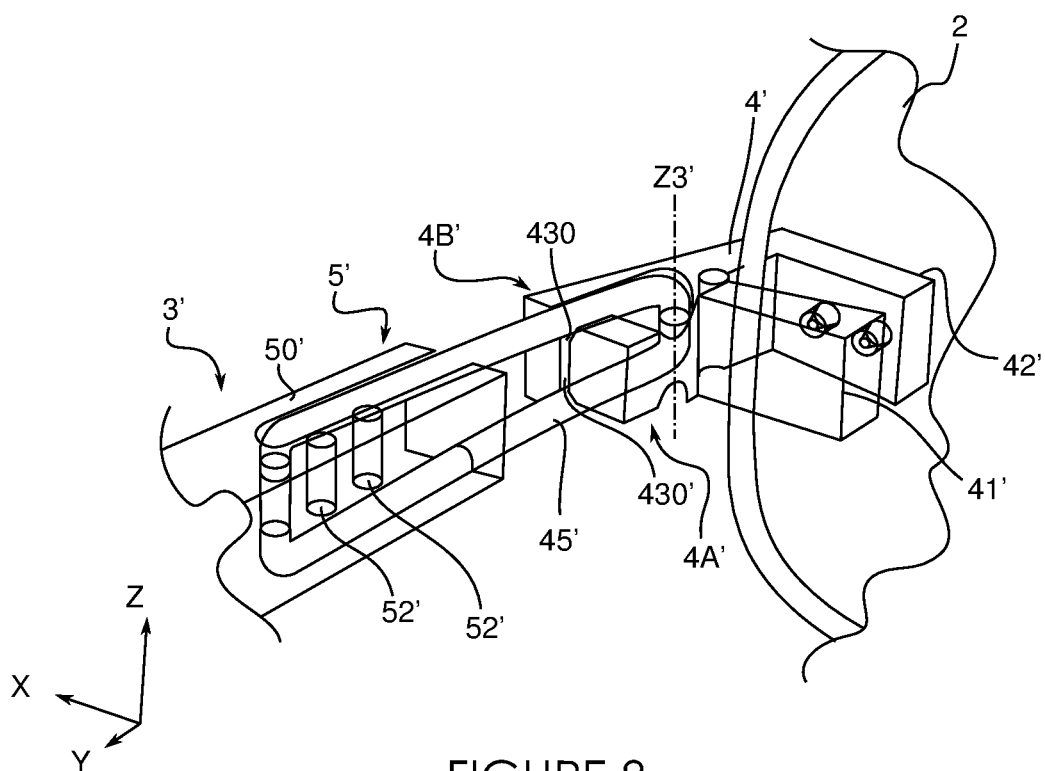
FIG. 8 is a perspective view of another embodiment of a connection between a lens and a temple of the frame.

In reference to FIG. 8, another embodiment is shown of a temple 3' which comprises a front portion 4' connected to the lens 2 and a rear portion 5' intended to be in contact with the temple of the user which is hinged. The rear portion 5' comprises a first element 50' and a second element 45'. The second element 45' is hinged with the front portion 4' but is connected in an adjustable way with the first element 50' of the rear portion 5'.

Figure 9:
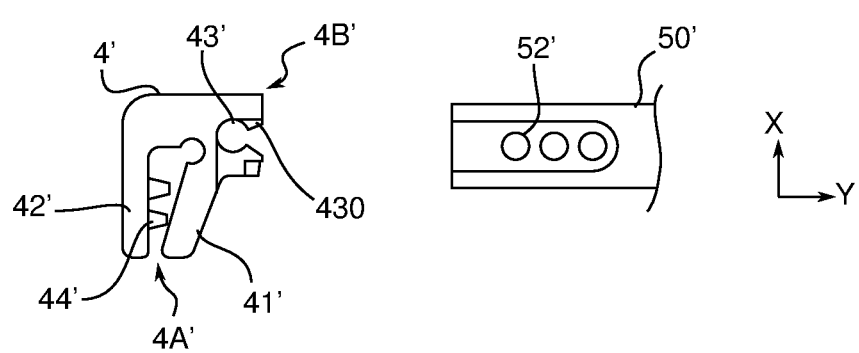
FIG. 9 is a cross-section view of certain elements of the temple of FIG. 8.

In this example, in reference to FIGS. 8 and 9 and in a way that is similar to the first embodiment, the front portion 4' of the temple 3' has the form of a flexible clamping element comprising a connection portion 4A' comprising two jaws 41', 42' which are suitable for clamping the glasses lens 2 and a joining portion 4B' comprising a cavity 43', extending vertically, configured to allow said jaws 41', 42' to open following a pressing. In this example, the cavity 43' is open laterally via a slot 430'. As indicated hereinabove, if the operator deforms by pressing the cavity 43', the jaws 41', 42' separate due to the flexibility of the clamping element in the manner of a clothespin. As shown in FIG. 9, one of the jaws 41', 42' comprises teeth 44' in order to clamp the lens 2 as shown in FIG. 8. In this example, the front portion 4' of the temple 3' has a 90° bend.

As shown in FIGS. 8 and 9, the first element 50' of the rear portion 5' of the temple 3' comprises a longitudinal body, suited to come into contact with the temples of a user, and a plurality of mounting openings 52' of which the axis extends, preferably, vertically. The mounting openings 52' are aligned longitudinally in the body of the first element 50' of the rear portion 5' of the temple 3' in order to allow for the adjusting of the length of the temple 3' as shall be presented in what follows.

Figure 10:
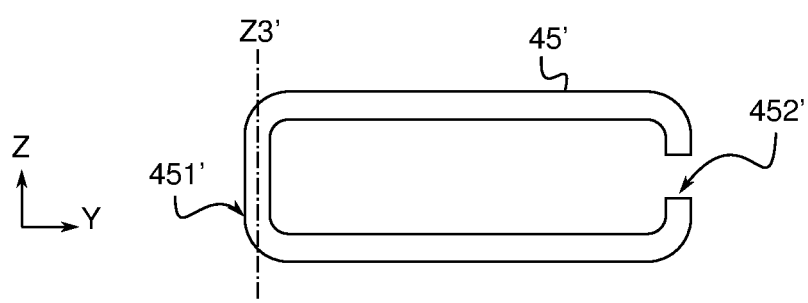
FIG. 10 is a view of an element of the rear portion of the temple of FIG. 8.

The second element 45' of the rear portion 5' of the temple 3' has the form of a loop of which the periphery is open in such a way as to define two ends facing one another as shown in FIG. 10. The second element 45' is of a substantially rectangular shape in such a way as to define a length and a width, with the periphery of the loop being open at the level of its width. As such, the second element 45' comprises a full width 451' and an open width 452' as shown in FIG. 10.

The full width 451' of the second element 45' can be introduced, more preferably by force, into the cavity 43' of the front portion 4' via the slot 430' in order to allow the second element 45' to be hinged with the front portion 4' according to a hinged axis Z3'. Similarly to the first embodiment, the mounting locks the jaws 41', 42' on the lens 2. In other words, the full width 451' forms a locking element.

Similarly, the open width 452' of the second element 45' can be introduced into one of the openings 52' of the first element 50' of the rear portion 5' by toying with the flexibility of the ends of the second element 45'. The second element 45' is then connected with the first element 50'. According to the opening selected 52', the length of the temple 3' is modified.

Similarly to the first embodiment, the temple 3' can be mounted/dismounted in a practical manner and quickly without the assistance of tools.

Thanks to this embodiment, the length of the temple 3' can advantageously be adjusted in a practical manner and allow for an optimum folding of the temple 3'.

The invention claimed is:

1. A rimless glasses frame comprising:
   at least one flexible clamping element comprising:
   i. at least one connection portion comprising at least two jaws sized and shaped to clamp at least one lens, and
   ii. at least one joining portion comprising at least one cavity having a width, wherein said at least two jaws open when said width of said at least one cavity decreases, and
   at least one locking element mounted in said at least one cavity of said at least one joining portion of the clamping element to lock said at least two jaws closed, wherein said at least one flexible clamping element is hinged with said at least one locking element to fold at least one temple of said frame.

2. A frame according to claim 1, wherein said at least one flexible clamping element is a single piece.

3. A frame according to claim 1, wherein said at least one flexible clamping element is made of plastic.

4. A frame according to claim 1, wherein at least one of said at least two jaws comprises at least one tooth suitable for cooperating with an orifice of a glasses lens.

5. A frame according to claim 1, wherein said at least one temple comprises at least one front portion comprising said at least one flexible clamping element and said at least one locking element.

6. A frame according to claim 5, wherein said at least one temple further comprises a rear portion comprising a first element and a second element connected in an adjustable way.

7. A frame according to claim 1 comprising at least one central bridge comprising at least one main member comprising at least one central flexible clamping element, and at least one auxiliary member comprising another at least one central locking element.

8. A pair of glasses comprising two lenses and a glasses frame according to claim 1.

9. A method for mounting a pair of rimless glasses according to claim 8 comprising:
   a step of applying a compressive force to walls of said at least one cavity of said at least one flexible clamping element to open said at least two jaws;
   a step of inserting said at least one lens between said at least two jaws;
   a step of stopping application of said compressive force to close said at least two jaws such that said at least two jaws clamp said at least one lens;
   a step of mounting said at least one locking element in said at least one cavity of said at least one clamping element to lock said at least two jaws closed on said at least one lens.

10. A frame according to claim 1, comprising at least one central bridge comprising at least one main member comprising at least two flexible clamping elements, and at least one auxiliary member comprising at least two locking elements.

11. A frame according to claim 7, wherein said at least one auxiliary member opens said at least two central jaws of said at least one central flexible clamping element when at least one section of said at least one auxiliary member is compressed.

12. A frame according to claim 11, wherein said at least one central locking element prevents said at least one auxiliary member from opening said at least two central jaws when said at least one central locking element is inserted in said at least one auxiliary member.

13. A frame according to claim 12, wherein said at least one central locking element also prevents said at least one auxiliary member from opening another at least two central jaws when said at least one central locking element is inserted in said at least one auxiliary member.

14. A frame according to claim 7, wherein said at least one central locking element comprises at least one first imprint to adapt to a first nose of a first wearer.

15. A frame according to claim 14, further comprising a second at least one central locking element comprising at least one second imprint to adapt to a second nose of a second wearer.

16. A frame according to claim 1, wherein said at least one joining portion and at least one connection portion are located on opposing sides of said at least one flexible clamping element.

17. A frame according to claim 1, wherein said at least one joining portion and at least one connection portion are located on orthogonal sides of said at least one flexible clamping element.

18. A frame according to claim 1, wherein said at least one temple has at least two mounting openings, and wherein said at least one locking element is disposed to mate with either of said at least two mounting openings.

19. A frame according to claim 1, wherein said at least two jaws comprises a metal material.

\* \* \* \* \*